(12) United States Patent
Keckes et al.

(10) Patent No.: US 9,494,679 B2
(45) Date of Patent: Nov. 15, 2016

(54) RADAR-TRANSPARENT COATING

(75) Inventors: Antal Keckes, Gottmadingen (DE); Peter Schuler, Nagold (DE); Carlos Ribeiro, Saigon (VN)

(73) Assignee: OERLIKON SURFACE SOLUTIONS AG, PFAFFIKON, Pfaffikon SZ (CH)

( * ) Notice: Subject to any disclaimer, the term of this patent is extended or adjusted under 35 U.S.C. 154(b) by 637 days.

(21) Appl. No.: 13/981,948

(22) PCT Filed: Dec. 23, 2011

(86) PCT No.: PCT/EP2011/006545
§ 371 (c)(1),
(2), (4) Date: Oct. 23, 2013

(87) PCT Pub. No.: WO2012/100805
PCT Pub. Date: Aug. 2, 2012

(65) Prior Publication Data
US 2014/0049427 A1    Feb. 20, 2014

Related U.S. Application Data

(60) Provisional application No. 61/436,665, filed on Jan. 27, 2011.

(30) Foreign Application Priority Data

Apr. 11, 2011    (DE) .................. 10 2011 016 683

(51) Int. Cl.
*G01S 1/00*    (2006.01)
*G01S 13/86*    (2006.01)
(Continued)

(52) U.S. Cl.
CPC ............. *G01S 13/86* (2013.01); *H01Q 1/3233* (2013.01); *H01Q 1/3283* (2013.01); *H01Q 1/422* (2013.01); *H01Q 1/44* (2013.01); *Y10T 428/265* (2015.01)

(58) Field of Classification Search
CPC ....... G01S 13/86; G01S 1/00; H01Q 1/3233; H01Q 1/3283; H01Q 1/422; H01Q 1/44
USPC ........................................... 342/385
See application file for complete search history.

(56) References Cited

U.S. PATENT DOCUMENTS 5,273,815 A    12/1993    Brydon et al.
5,373,306 A    12/1994    Amore et al.
(Continued)

FOREIGN PATENT DOCUMENTS

DE    198 44 021 A1    4/2000
DE    102007059758 A1 *    6/2009    ............... H01Q 1/42
(Continued)

OTHER PUBLICATIONS

International Preliminary Report on Patentability for PCT/EP2011/006545, dated Jul. 30, 2013.
(Continued)

*Primary Examiner* — Harry Liu
(74) *Attorney, Agent, or Firm* — Pearne & Gordon LLP

(57) ABSTRACT

The invention relates to a radar-transparent component comprising a plastic body. Said component is characterized in that at least parts of the surface have a coating with a thickness of between 10 nm and 100 nm that comprises a semiconductor. Said coating gives the plastic body the desired metallic appearance without the body losing the characteristic of a radar-transparent component.

18 Claims, 2 Drawing Sheets

Figure 1:
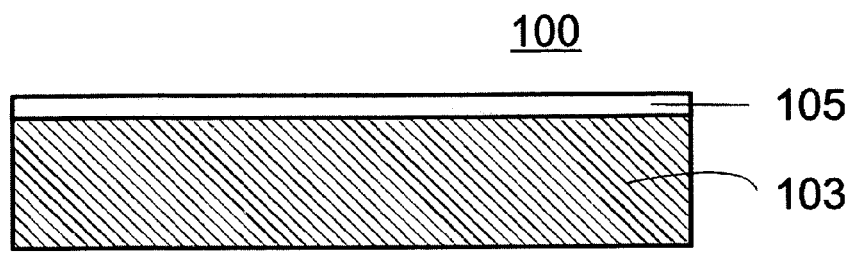

(51) Int. Cl.
*H01Q 1/32* (2006.01)
*H01Q 1/42* (2006.01)
*H01Q 1/44* (2006.01)

(56) References Cited

U.S. PATENT DOCUMENTS

| | | | |
|---|---|---|---|
| 5,608,414 A | 3/1997 | Amore | |
| 6,328,358 B1 | 12/2001 | Berweiler | |
| 2007/0218657 A1* | 9/2007 | Bet | C30B 13/24 438/479 |
| 2011/0103421 A1* | 5/2011 | Sharma | B82Y 20/00 372/45.012 |
| 2011/0273356 A1 | 11/2011 | Kawaguchi et al. | |

FOREIGN PATENT DOCUMENTS

| | | | | |
|---|---|---|---|---|
| DE | 10 2009 025950 A1 | 12/2010 | | |
| DE | 102011014902 B3 * | 2/2012 | ......... | B29C 45/1418 |
| WO | 2010/084733 A1 | 7/2010 | | |

OTHER PUBLICATIONS

International Search Report for PCT/EP2011/006545 dated Mar. 1, 2012.

* cited by examiner

RADAR-TRANSPARENT COATING

The present invention relates to a radar device placed behind a cladding, wherein at least parts of the cladding lie in the ray path of the radar device. A radar device can mean for example a radar ray source, a sensor for radar waves or the combination of both.

Radar devices are used for example in vehicles for measuring the distance. Often, such a device is placed behind the front grille of the vehicle. The corresponding radar device should not be visible from the outside and must therefore be placed behind a cladding. The radar waves relevant for these applications are preferably in the frequency range around 76-77 GHz. The cladding should be to a large extent penetrable to radar waves in this frequency range, however on the other hand produce the desired optical impression. A metallic appearance in particular is often desired.

DE 198 44 021 discloses a cladding part of plastic lying within the ray path of a radar device with a portion of metal visible from the outside, wherein the portion of metal is formed of an extremely thin, i.e. 40 nm thick, vaporized metallic coating. This coating, according to the description in question, corresponds optically to the neighboring chrome trim strips referred to therein.

It is possible with the arrangement disclosed in DE 198 44 021 to achieve an optically metallic impression. However, due to the metallic properties of the coating and despite the low coating thickness, a non-negligible portion of the radar waves continues to be absorbed and is no longer available as signal. Furthermore, the use of metallic coatings essentially allows no adaptations in terms of the optical impression. The latter therefore cannot be varied at all or only to a very small extent.

It is thus an aim of the present invention to overcome or at least mitigate the problems, described above, of the prior art.

According to the invention, this aim is achieved in that a cladding formed of radar-transparent material, such as for example plastic, is coated with a thin layer, preferably between 10 nm and 100 nm thick, that comprises at least one semiconductor material (hereinafter also called semiconductor layer). For this purpose, silicon is particularly suitable as a coating material. This coating can be obtained by means of physical vapor deposition (PVD). Dense, and thus preferred, coatings can be achieved by means of a magnetron sputtering process. It is however also possible to use chemical vapor deposition (CVD).

In the frame of this description, a semiconductor layer and a layer comprising at least a semiconductor are to be considered equivalent.

Figure 4:
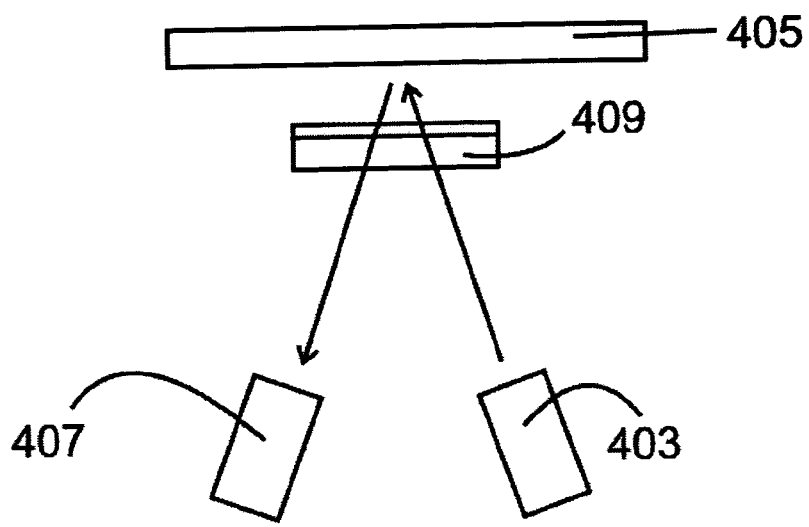

In the frame of this description, a component is considered a radar-transparent component if, when radar rays pass twice through the component, at least 0.1% of the intensity I reaches the sensor, relatively to the intensity $I_0$ which would otherwise reach the sensor without passing through the component. Preferably, at least 1% ($I/I_0 \geq 1\%$) will arrive, even more preferably 5% or more. FIG. 4 sketches a measurement set-up, with a radar source 403, a reflection object 405, a radar sensor 407 and the component 409 to be measured. The ray path is indicated by arrows. The reference measurement of the intensity $I_0$ is performed without the component 409. The transmission measurement of the intensity I is performed with the component 409.

The invention will now be described in more detail on the basis of examples and of the figures.

FIG. 1 shows an inventive component 101 with a radar-transparent body 103 and a coating 105 comprising a semiconductor material.

Figure 2:
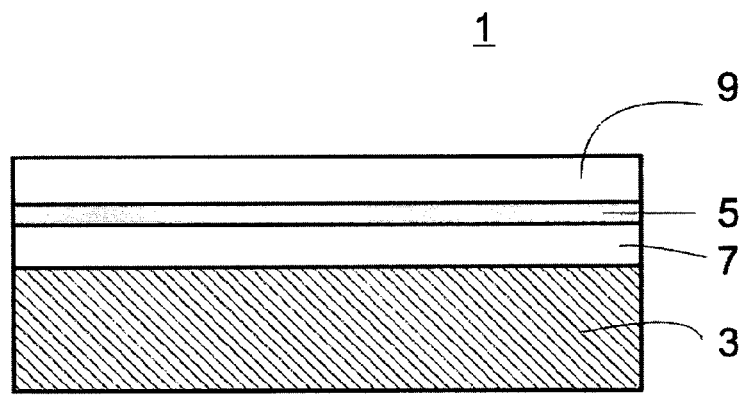

FIG. 2 shows a component 1 comprising a radar-transparent body 3, for example a plastic body, and a coating 5 comprising a semiconductor, as well as a polymer layer 7 between the layer 5 and the substrate and a polymer layer 9 on the coating 5.

Figure 3:
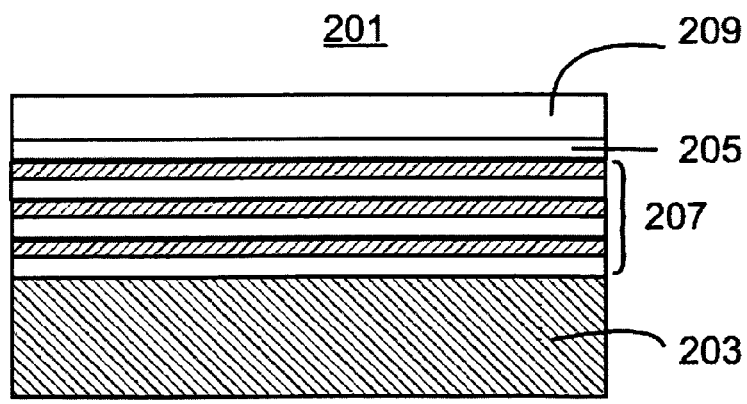

FIG. 3 shows an inventive component 201 with radar-transparent body 203, wherein the coating 205 comprising the semiconductor is embedded between a polymer layer 209 and an alternating layer system 207. The alternating layer system is executed as an interference layer system. The one skilled in the art can use the commercially available thin-film design programs such as for example OptiLayer, in order to achieve the desired optical function. In particular, the semiconductor coating can be positioned at will or can also be separated into several thinner layers.

FIG. 4 shows a schematic diagram of a measurement set-up.

According to a first embodiment of the present invention, a silicon layer with a thickness of 35 nm (i.e. within the 10 nm to 100 nm thickness range) is deposited as semiconductor layer onto a black plastic substrate. In order to smooth any potential surface structures, a primer (UV acryl lacquer) is first applied onto the plastic surface. After applying the Si-layer by means of magnetron sputtering, a top layer (UV acryl lacquer) is applied in the present example for additional protection of the thin Si-layer. This results in a bluish to yellowish metallically shimmering surface. The radar transparency at 76-77 GHz of the substrate coated according to the invention is not essentially less than that of the comparable uncoated substrate.

A diagrammatic representation corresponding to the first embodiment is shown in FIG. 2.

According to a second embodiment of the present invention, the semiconductor layer is executed as a layer system, preferably as an interference layer system. This can for example be structured as alternating layer system with a semiconductor, e.g. Si and a dielectric, e.g. $SO_2$. The total thickness of the Si-layers should in this case again be in the range between 10 nm and 100 nm. In order to achieve the desired transmission and reflection characteristic in the visible range of the spectrum of electromagnetic rays, performance-enhanced optimization programs for optical thin-films are nowadays available to the one skilled in the art. A more in-depth explanation in this respect is therefore eschewed in the present case.

According to a third embodiment of the present invention, Germanium is used as semiconductor material for the coating. This coating can also be executed as an individual thin monolayer with a thickness of 10 nm to 100 nm or as an alternating layer system with one or several dielectrics, such as for example $SO_2$. In particular, Ge can also be combined with Si in order to achieve the desired effects.

In the frame of this description, a radar-transparent component was disclosed that comprises a radar-transparent body, preferably a plastic body, wherein at least parts of the surface have a coating with a thickness between 10 nm and 100 nm that comprises at least one semiconductor material.

The coating comprising at least one semiconductor can comprise silicon, preferably comprises silicon as a main component and even more preferably consists essentially of silicon.

The layer comprising at least one semiconductor can be a component of a layer system comprising at least one further layer, which is preferably an interference layer system.

The at least one other layer can be SO$_2$.

The layer system can be an alternating layer system.

Between the plastic body and the coating comprising at least one semiconductor, it is possible to provide an intermediary layer comprising a polymer layer that preferably consists of a UV-hardened lacquer.

On the radar-transparent component, it is possible to provide as sealing layer against the environment a polymer coating, which preferably consists of a UV-hardened lacquer.

The radar-transparent component can be part of a cladding element, wherein this cladding element is preferably a cladding element for a motor vehicle.

A vehicle with a radar device is disclosed, wherein a radar-transparent component according to the possibilities described above is provided in the ray path of the radar device and this component is preferably at least part of a cladding element.

A method for producing a radar-transparent component is disclosed, having the steps of:
 providing a plastic body
 coating the plastic body with a coating comprising a semiconductor material and whose thickness is between 10 nm and 100 nm, wherein the coating is achieved by means of a vacuum process.

The vacuum process is preferably a PVD and/or a CVD process.

The invention claimed is:

1. Radar-transparent component comprising:
 a radar-transparent body and
 a coating on at least part of the surface of the radar-transparent body, the coating having a thickness between 10 nm and 100 nm and comprising at least one semiconductor material
 wherein the coating comprising at least one semiconductor material is a component of a layer system comprising at least one further layer.

2. Radar-transparent component according to claim 1, characterized in that the coating comprising at least one semiconductor material comprises silicon.

3. Radar-transparent component according to claim 1, characterized in that the at least one other layer is SiO$_2$.

4. Radar-transparent component according to claim 1, characterized in that the layer system is an alternating layer system.

5. Radar-transparent component according to claim 1, characterized in that between the radar-transparent body and the coating comprising at least one semiconductor, an intermediary layer is provided comprising a polymer layer.

6. Radar-transparent component according to claim 1, characterized in that as a sealing layer against the environment, a polymer coating is provided.

7. Cladding element with a radar-transparent component according to claim 1, wherein this cladding element is a cladding element for a motor vehicle.

8. Motor vehicle with a radar device, characterized in that a radar-transparent component according to claim 1 is provided in the ray path of the radar device.

9. Method for producing a radar-transparent component, having the steps of:
 providing a radar-transparent body and
 coating the radar-transparent body with a coating comprising a semiconductor material and at least one further layer to form a component of a layer system,
 wherein the coating thickness is between 10 nm and 100 nm, and
 wherein the coating is achieved by means of a vacuum process.

10. Method according to claim 9, characterized in that the vacuum process is a PVD and/or a CVD process.

11. Radar-transparent component according to claim 1, wherein the radar-transparent body is a plastic body.

12. Radar-transparent component according to claim 2, wherein the coating comprises silicon as a main component.

13. Radar-transparent component according to claim 2, wherein the coating consists essentially of silicon.

14. Radar-transparent component according to claim 1, wherein the layer system comprises an interference layer system.

15. Radar-transparent component according to claim 5, wherein the polymer layer consists of a UV-hardened lacquer.

16. Radar-transparent component according to claim 6, wherein the polymer coating consists of a UV-hardened lacquer.

17. Motor vehicle according to claim 8, wherein the radar-transparent component is at least part of a cladding element.

18. Method according to claim 9, wherein the radar-transparent body is a plastic body.

* * * * *

UNITED STATES PATENT AND TRADEMARK OFFICE
CERTIFICATE OF CORRECTION

PATENT NO. : 9,494,679 B2  Page 1 of 1
APPLICATION NO. : 13/981948
DATED : November 15, 2016
INVENTOR(S) : Antal Keckes et al.

It is certified that error appears in the above-identified patent and that said Letters Patent is hereby corrected as shown below:

In the Specification

Column 2, Line 40, replace "$SO_2$" with -- $SiO_2$ --.

Column 2, Line 54, replace "$SO_2$" with -- $SiO_2$ --.

Column 3, Line 1, replace "$SO_2$" with -- $SiO_2$ --.

Signed and Sealed this
Seventh Day of March, 2017

Michelle K. Lee
*Director of the United States Patent and Trademark Office*